US008643981B2

(12) United States Patent
Natori

(10) Patent No.: US 8,643,981 B2
(45) Date of Patent: Feb. 4, 2014

(54) MAGNETIC DOMAIN CONTROL FOR AN EMBEDDED CONTACT SENSOR FOR A MAGNETIC RECORDING HEAD

(75) Inventor: Shoji Natori, Hadano (JP)

(73) Assignee: HGST Netherlands B. V., Amsterdam (NL)

( * ) Notice: Subject to any disclaimer, the term of this patent is extended or adjusted under 35 U.S.C. 154(b) by 137 days.

(21) Appl. No.: 13/339,317

(22) Filed: Dec. 28, 2011

(65) Prior Publication Data

US 2013/0170068 A1    Jul. 4, 2013

(51) Int. Cl.
*G11B 5/60*    (2006.01)
*G11B 5/127*    (2006.01)

(52) U.S. Cl.
USPC .................................... 360/234.4; 360/125.3

(58) Field of Classification Search
USPC ............................. 360/234.4, 125.3, 125.71
See application file for complete search history.

(56) References Cited

U.S. PATENT DOCUMENTS

| | | | |
|---|---|---|---|
| 5,018,037 A | 5/1991 | Krounbi et al. | |
| 5,206,590 A | 4/1993 | Dieny et al. | |
| 5,527,110 A | 6/1996 | Abraham et al. | |
| 5,532,892 A | 7/1996 | Nix et al. | |
| 5,640,089 A | 6/1997 | Horikawa et al. | |
| 6,088,176 A * | 7/2000 | Smith et al. | 360/46 |
| 6,239,936 B1 * | 5/2001 | Abraham et al. | 360/75 |
| 6,239,954 B1 * | 5/2001 | Segar et al. | 360/313 |
| 6,262,572 B1 * | 7/2001 | Franco et al. | 324/212 |
| 6,329,655 B1 * | 12/2001 | Jack et al. | 250/338.1 |
| 6,417,981 B1 * | 7/2002 | Smith | 360/75 |
| 6,822,814 B2 | 11/2004 | Ng et al. | |
| 6,822,816 B2 * | 11/2004 | Dakroub | 360/31 |
| 6,956,707 B2 | 10/2005 | Ottesen et al. | |
| 6,992,865 B2 * | 1/2006 | Thurn et al. | 360/294.7 |
| 7,064,933 B2 * | 6/2006 | Macken et al. | 360/294.7 |
| 7,292,401 B2 * | 11/2007 | Shen et al. | 360/69 |
| 7,385,789 B2 * | 6/2008 | Hu et al. | 360/294.7 |
| 7,440,220 B1 * | 10/2008 | Kang et al. | 360/75 |
| 7,505,227 B2 * | 3/2009 | Lee et al. | 360/234.4 |
| 7,589,928 B2 | 9/2009 | Roy et al. | |
| 7,660,068 B1 * | 2/2010 | Baumgart et al. | 360/75 |
| 7,796,356 B1 | 9/2010 | Fowler et al. | |
| 7,815,369 B2 | 10/2010 | Antoku et al. | |
| 7,948,713 B2 * | 5/2011 | Ohta et al. | 360/235.2 |
| 8,279,550 B1 * | 10/2012 | Hogg | 360/75 |

(Continued)

OTHER PUBLICATIONS

Watson et al., "Contact Noise in MR Read Sensors for Ultra-High Density Flexible Media Applicatons," 2003 IEEE, IEEE International Magnetics Conference, 2003, INTERMAG 2003, Issued Mar. 28-Apr. 3, 2003, pp. DQ-02.

(Continued)

*Primary Examiner* — Brian Miller
(74) *Attorney, Agent, or Firm* — Zilka-Kotab, PC

(57) ABSTRACT

A head for magnetic data recording that includes an embedded contact sensor. The embedded contact sensor detects head disk contact by detecting changes in temperature as a result of contact between the head and the disk. The embedded contact sensor includes a thermoresistive layer and a structure for pinning the magnetic domains of the thermoresistive layer. This pinning of the magnetic domains prevents the thermoresistive layer from changing resistance in response to magnetic fields (rather than temperature) so as to avoid unwanted signal noise as a result of a magnetic signal from the magnetic media.

12 Claims, 4 Drawing Sheets

(56) References Cited

U.S. PATENT DOCUMENTS

| | | | |
|---|---|---|---|
| 2002/0097513 A1* | 7/2002 | Ng et al. | 360/31 |
| 2006/0061910 A1* | 3/2006 | Thurn et al. | 360/234.7 |
| 2008/0084628 A1* | 4/2008 | Ohta et al. | 360/59 |
| 2008/0100965 A1* | 5/2008 | Oki | 360/234.3 |
| 2008/0225426 A1* | 9/2008 | Roy et al. | 360/31 |
| 2010/0182723 A1 | 7/2010 | Yanagisawa | |
| 2013/0083430 A1* | 4/2013 | Chiu et al. | 360/234.3 |

OTHER PUBLICATIONS

Abraham et al., "Thermal Proximity Imaging of Hard-Disk Substrates," 2000 IEEE, IEEE Transactions on Mathematics, vol. 36, No. 6, Nov. 2000, pp. 3997-4004.

Gatzen et al., "Dual Stripe Sensor on a Picoslider for In-Contact Thermal Asperity Testing," 1998 IEEE, IEEE Transactions on Magnetics, vol. 34, No. 4, Jul. 1998, pp. 1702-1704.

* cited by examiner

MAGNETIC DOMAIN CONTROL FOR AN EMBEDDED CONTACT SENSOR FOR A MAGNETIC RECORDING HEAD

FIELD OF THE INVENTION

The present invention relates to magnetic data recording and more particularly to a magnetic read head having an embedded contact sensor with magnetic domain stabilization for improved detection of head disk contact.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor or a Tunnel Junction Magnetoresivise (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When a sense current is conducted through the spin valve sensor, resistance changes cause potential changes that are detected and processed as playback signals.

In order to maximize the performance of a magnetic data recording system it is important to minimize the magnetic spacing between the read and write heads and the magnetic medium. However, as this magnetic spacing decreases, the probability of head disk contact during operation also increases. Contact between the head and the magnetic medium (e.g. disk) can have catastrophic effects, including damage to the magnetic sensor and damage to the magnetic media resulting in loss of data and failure of the magnetic recording system. One way to monitor the spacing between the head and the disk is to incorporate an embedded contact sensor in order to determine when head disk contact has occurred or is likely to occur. However, such embedded sensor suffer from extreme signal noise, such as from magnetic signals from the magnetic media that can prevent the embedded contact sensor from accurately determining whether head disk contact has occurred or is imminent.

SUMMARY OF THE INVENTION

The present invention provides an embedded contact sensor that includes a thermoresistive layer; and a structure for pinning magnetic domains in the thermoresistive layer.

The structure for pinning the magnetic domains of the thermoresistive layer can be a hard magnetic structure formed at the sides of the thermoresistive layer or can be a layer of antiferromagnetic material that is exchange coupled with the thermoresistive layer.

The domain pinning structure of the present invention advantageously prevents the embedded contact sensor from inadvertently detecting magnetic fields through a magnetoresistive effect such as an anisotropic magnetoresistive (AMR) effect. This greatly reduces signal noise and prevents inadvertently mistaking a magnetic signal for a head disk contact.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
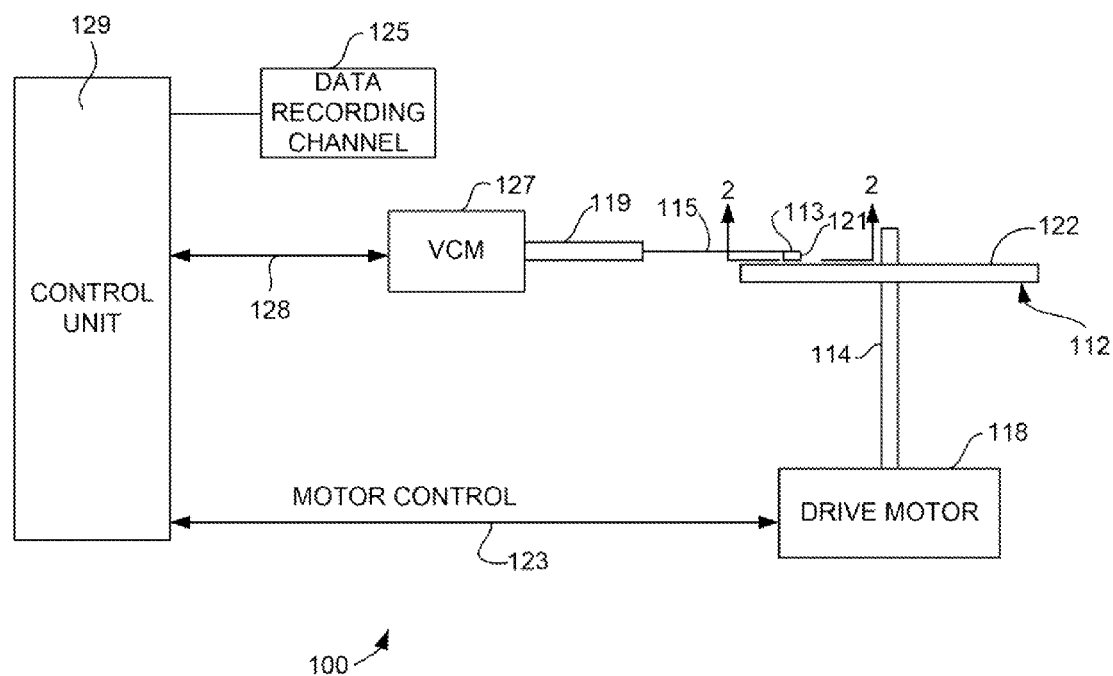
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
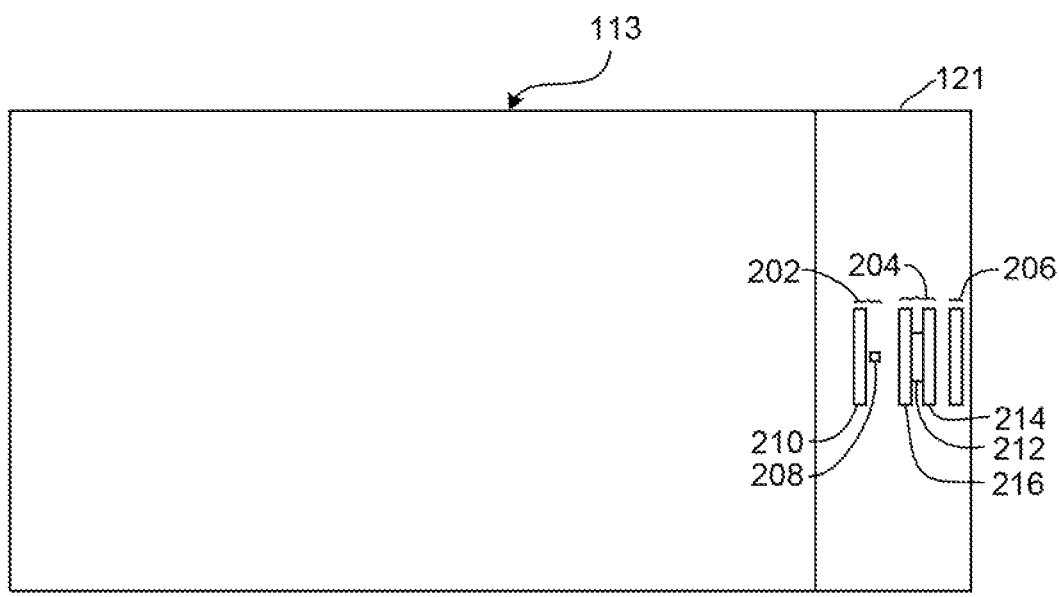
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write element 202 and a read element 204, is located at a trailing edge of the slider. The magnetic head 121 also includes an embedded contact sensor 206, which will be described in greater detail herein below. The embedded contact sensor 206 has an electrical resistance that changes in response to heat generated as a result of head disk contact. This change in electrical resistance can be detected by processing circuitry (not shown in FIG. 2). The above description of a typical magnetic disk storage system and the accompanying illustration of FIG. 1 are for representation purposes only. It should be apparent that disk storage systems may contain a large number of disks and actuators, and each actuator may support a number of sliders.

The magnetic write head 202 is an inductive write head that includes a magnetic write pole 208 and a magnetic return pole 210. A write coil (not shown in FIG. 2) produces a magnetic field that causes a magnetic flux to flow through the write pole 208 that generates a magnetic write field that emits from the write pole 208 toward the magnetic medium 112 (FIG. 1). This magnetic write field is sufficiently strong to write a magnetic bit to the magnetic media. The magnetic flux returns the return pole 210 where it is sufficiently spread out and weak that it does not erase the previously recorded magnetic bit.

The read head 204 includes a magnetoresistive sensor 212 such as a giant magnetoresistive sensor (GMR) or a tunnel magnetoresistive sensor (TMR). The magnetoresistive sensor 212 is sandwiched between first and second magnetic shield 214, 216, which can be constructed of an electrically conductive magnetic material so that they can function as electrically conductive leads as well as magnetic shields.

Figure 3:
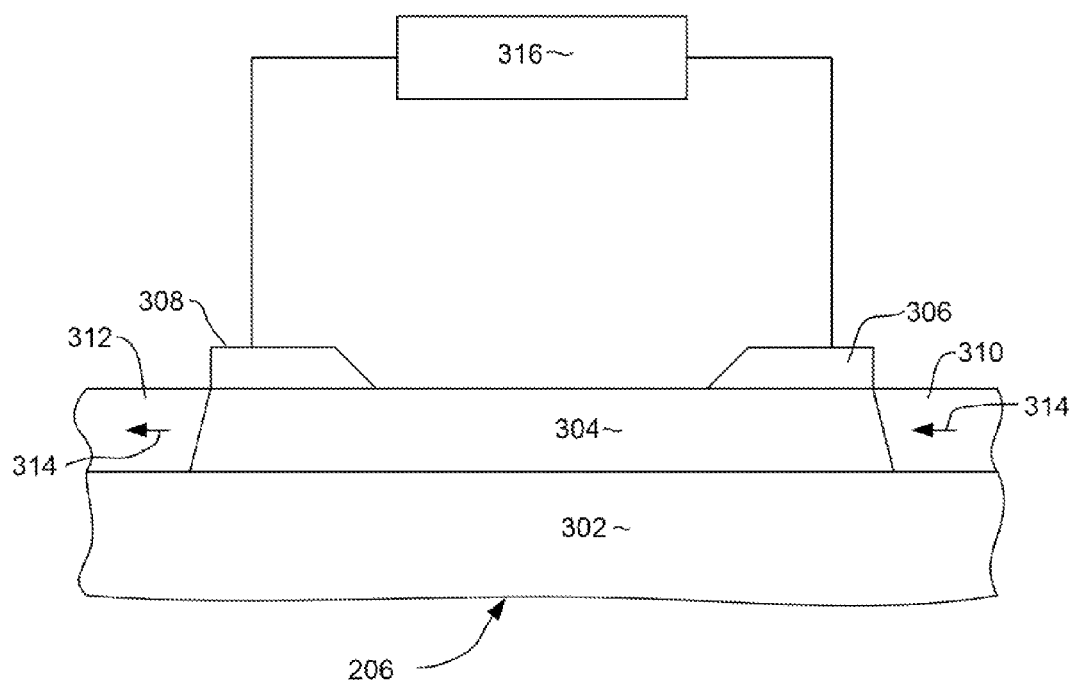
FIG. 3 is a schematic ABS view of an embedded contact sensor according to an embodiment of the invention.

With reference now to FIG. 3, an embedded contact sensor 206 according to an embodiment of the invention will be described. The embedded contact sensor 206 includes a thermoresistive layer 304 that is constructed of a material that has an electrical resistance that changes in response to a change in temperature. This layer 304 can be formed on a substrate 302 that can be a non-magnetic, electrically insulating material such as alumina. The thermoresistive layer 304 detects the heat generated by contact between the head and the disk as a change in resistance value. Contact leads 306, 308 can be provided in order to supply a voltage across the thermoresistive layer 304 and these leads 306, 308 can be connected with processing circuitry 316 that can detect the change in resistance across the layer 304 as a result of a head/disk contact induced rise in temperature. Unlike a GMR or TMR magnetoresistive sensor, which can have include a magnetic pinned layer, a magnetic free layer, a non-magnetic layer sandwiched between the free and pinned as well as other layers arranged specifically to produce a change in resistance in response to a magnetic field, the layer 304 is preferably a simple, single layer of material that is specifically chosen to produce a change in electrical resistance in response to a change in temperature.

The temperature coefficient of this layer 304 determines the sensitivity of the sensor 206 during contact. Generally, a metal material having a large temperature coefficient such as nickel ($6.7*10^{-3}/°$ C.), iron ($6.6*10^{-3}/°$ C.), or cobalt ($6*10^{-3}/°$ C.) is used. Therefore, the layer 304 can be constructed of Ni, Co, Fe or a combination of these materials. However, in addition to having thermoresistive properties, these materials also have magnetoresistive properties. This can be based on the anisotropic magnetoresistive (AMR) effect. This means that the resistance of the layer 304 changes in response to a magnetic field. When the contact sensor 206 is close to the magnetic media, the magnetic signal from the magnetic media results in a change in resistance in the layer 304. Ideally, the embedded contact sensor should only produce a signal in response to contact with the disk/media. This magnetic response is the result of magnetic domain movement in the layer 304. Therefore, the resistance change resulting from the magnetic field from the media produces noise in the signal from the contact sensor 602 and can lead to a false positive head/disk contact indication. In addition, transitions arise in the resistance of layer 304 by the motion of the magnetic domain caused by changes in stress or heat during contact. These changes become noise components in the contact detection between the magnetic head and the magnetic disk and become a source of incorrect contact indication.

The present invention overcomes this problem by pinning the magnetic domain of the layer 304 to prevent heat, stress or external magnetic fields from causing changes in the magnetic domain of the layer 304, which would result in an inadvertent change in resistance of the layer 304.

In the embodiment of FIG. 3, in order to pin the magnetic domains of the layer 304, hard magnets 310, 312 are provided at either side of the thermoresistive layer 304. These layers can be a high magnetic coercivity, magnetic material that preferably has a desired magnetic anisotropy, such as a shape induced magnetic anisotropy. Suitable materials for the layers 310, 312 could be, for example, CoPt or CoPtCr. In addition, certain seed layers (not shown) could be provided to induce a desired grain structure and desired magnetic properties in the layers 310, 312. This allows the layers 310, 312 to produce a magnetic pinning field 314 that pins the magnetic domain of the thermoresistive layer 304 in a direction parallel with the layer 304 and parallel with the ABS as indicated by arrows 314. With the magnetic domains of the thermoresistive layer 304 pinned in this manner, the resistance of the layer 304 will only respond to head disk contact induced heat spikes and not to external magnetic fields, such as those from the magnetic media.

Figure 4:
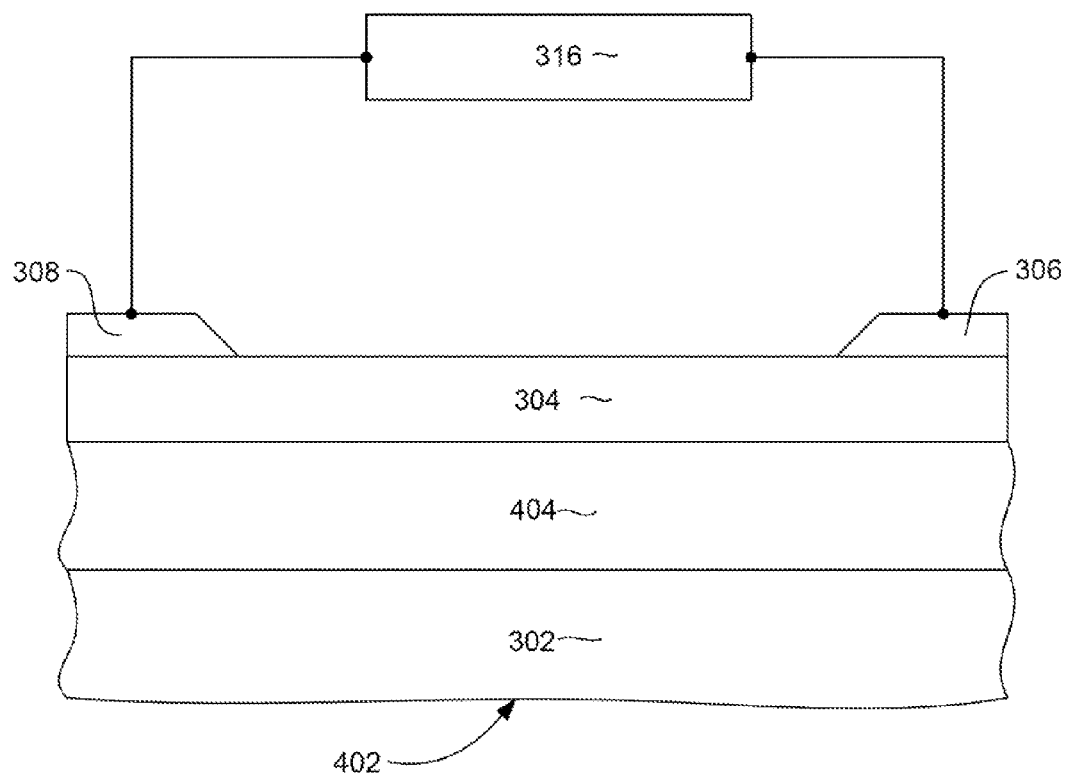
FIG. 4 is a schematic ABS vie of an embedded contact sensor according to an alternate embodiment of the invention.

FIG. 4 shows an embedded contact sensor 402 according to another embodiment of the invention. As with the previously described embodiment, the sensor 402 has a thermoresistive layer 304 that can be constructed of a material such as Ni, Fe, Co or a combination of these materials. The sensor 402 also has leads 306, 308 and processing circuitry 316 for detecting a change in resistance of the layer 304 as a result of a head/disk contact induced heat spike.

However in the sensor 402, rather than using hard magnetic layers at either side of the layer 304 (e.g. in series), the sensor 402 employs a layer of antiferromagnetic material 404 to pin the magnetic domains of the layer 304. The layer 404 can be constructed of an antiferromagnetic material such as IrMn, PtMn etc. and can be formed upon a substrate 302 such as alumina. One or more seed layers (not shown) can also be provided at the bottom of the layer 404 to insure desired magnetic properties in the layer 404.

The layer of antiferromagnetic material 404 is formed directly beneath the thermoresistive layer 304 and is exchange coupled with the thermoresistive layer 304. An antiferromagnetic material such as IrMn or PtMn does not have a magnetic moment in and of itself. However, when it is exchange coupled with a magnetic material (such as the layer 304) it very strongly pins the magnetization of the magnetic layer to which it is exchange coupled. Therefore, this layer 404 can strongly pin the magnetic domains of the thermoresistive layer 304. This very effectively prevents the resistance of the layer 304 from changing in response to a magnetic field such as that from the magnetic media.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A slider for use in a magnetic data recording system, the slider comprising:
a slider body;
a magnetic head formed on a trailing edge of the slider body, the magnetic head including a magnetic read element, a magnetic write element and an embedded contact sensor, the embedded contact sensor including a thermoresistive layer; and a structure for pinning magnetic domains in the thermoresistive layer.

2. The slider as in claim 1 wherein the structure for pinning the magnetic domains in the thermoresistive layer comprises a hard magnetic layer formed at a side of the thermoresistive layer, the hard magnetic layer producing a magnetic field that pins magnetic domains in the thermoresistive layer.

3. The slider as in claim 2 wherein the hard magnetic layer comprises CoPt or CoPtCr.

4. The slider as in claim 1 wherein the structure for pinning magnetic domains in the thermoresistive layer comprises a layer of antiferromagnetic material that is exchange coupled with the thermoresistive layer.

5. The slider as in claim 4 wherein the layer of antiferromagnetic material comprises IrM or PtMn.

6. The slider as in claim 1 further comprising circuitry connected with the thermoresistive layer for detecting a change in resistance of the thermoresisive layer as a result of a change in temperature.

7. The slider as in claim 1 wherein the thermoresistive layer comprises a single layer of material having a resistance that changes in response to temperature.

8. The slider as in claim 1 wherein the thermoresistive layer consists of Ni, Fe, Co or a combination of these materials.

9. A magnetic data recording system, comprising:
a housing;
a magnetic media rotatably mounted within the housing;
an actuator;
a slider connected with the actuator for movement adjacent to the magnetic medium, the slider further comprising:
a slider body;
a magnetic head formed on a trailing edge of the slider body, the magnetic head including a magnetic read element, a magnetic write element and an embedded contact sensor, the embedded contact sensor including a thermoresistive layer; and a structure for pinning magnetic domains in the thermoresistive layer.

10. The magnetic data recording system as in claim 9 wherein the structure for pinning the magnetic domains in the thermoresistive layer comprises a hard magnetic layer formed at a side of the thermoresistive layer, the hard magnetic layer producing a magnetic field that pins magnetic domains in the thermoresistive layer.

11. The magnetic data recording system as in claim 9 wherein the structure for pinning magnetic domains in the thermoresistive layer comprises a layer of anti ferromagnetic material that is exchange coupled with the thermoresistive layer.

12. The magnetic data recording system as in claim 9 further comprising circuitry connected with the thermoresistive layer for detecting a change in resistance of the thermoresisive layer as a result of a change in temperature.

* * * * *

UNITED STATES PATENT AND TRADEMARK OFFICE
CERTIFICATE OF CORRECTION

| | |
|---|---|
| PATENT NO. | : 8,643,981 B2 |
| APPLICATION NO. | : 13/339317 |
| DATED | : February 4, 2014 |
| INVENTOR(S) | : Natori |

Page 1 of 1

It is certified that error appears in the above-identified patent and that said Letters Patent is hereby corrected as shown below:

In the claims:

col. 6, line 49, replace "anti ferromagnetic" with --antiferromagnetic--.

Signed and Sealed this
Fourteenth Day of October, 2014

Michelle K. Lee
*Deputy Director of the United States Patent and Trademark Office*